(12) United States Patent
Gardner

(10) Patent No.: US 6,510,630 B1
(45) Date of Patent: Jan. 28, 2003

(54) ANIMAL EAR TAG AND METHOD OF APPLICATION

(76) Inventor: Michael Stuart Gardner, 108 Waiatarua Road, Remuera, Auckland 5 (NZ)

(*) Notice: Subject to any disclaimer, the term of this patent is extended or adjusted under 35 U.S.C. 154(b) by 20 days.

(21) Appl. No.: 09/670,996

(22) Filed: Sep. 27, 2000

Related U.S. Application Data

(63) Continuation-in-part of application No. 08/605,458, filed on Feb. 26, 1996, now abandoned.

(30) Foreign Application Priority Data

Feb. 24, 1995 (NZ) ................................................ 270564

(51) Int. Cl.⁷ ................................................ G09F 3/00
(52) U.S. Cl. ............................................ 40/301; 40/300
(58) Field of Search ...................................... 40/300, 301

(56) References Cited

U.S. PATENT DOCUMENTS

| | | | |
|---|---|---|---|
| 3,731,414 A | 5/1973 | Murphy et al. | |
| 3,934,368 A | * 1/1976 | Fearing | 40/301 |
| 4,060,922 A | 12/1977 | Reggers | |
| 4,612,877 A | 9/1986 | Hayes et al. | |
| 5,228,224 A | 7/1993 | Gardner | |
| 6,138,392 A | * 10/2000 | Haar et al. | 40/301 |

FOREIGN PATENT DOCUMENTS

| | | |
|---|---|---|
| EP | 105796 | 4/1984 |
| FR | 2304132 | 8/1976 |
| FR | 2403740 | 5/1979 |

* cited by examiner

Primary Examiner—Lynne H. Browne
Assistant Examiner—James M. Hewitt
(74) Attorney, Agent, or Firm—Marshall, Gerstein & Borun

(57) ABSTRACT

An animal ear tag wherein the head of the ear tag is engaged by a driving pin of the applicator, which is guided by an open slot or channel into an aperture in the head and into a bore extending towards a tip portion of the head. This allows easier fitment of the tag to an applicator in the circumstances where cross-infection through contact between the applicator pin and the animal's ear is not an issue.

5 Claims, 5 Drawing Sheets

ANIMAL EAR TAG AND METHOD OF APPLICATION

This is a continuation-in-part of application Ser. No. 08/605,458, filed Feb. 26, 1996, now abandoned.

BACKGROUND

This invention relates to animal ear tags and in particular, although not necessarily solely, ear tags provided as a single piece without a separate engaging portion with which the ear tag cooperates on opposed sides of the animal's ear.

Previous patents for ear tags have included some ear tags in which a main body portion, neck portion and head portion are provided so that a driving pin of an applicator may engage the head portion through the neck portion and both the neck and head portions are passed through the animal's ear. Those, such as the present inventor's previous tag described in U.S. Pat. No. 5,228,224, go to a some lengths to ensure that the applicator pin or driving means is protected from contact with the animal's ear through being sheathed within the neck and head portions of the tag. This leads to some difficulty in manipulation of the tag onto the driving means. This difficulty is particularly apparent in cold weather during which the material from which the tag is made may be less flexible. Further, this method is somewhat slower than may be necessary.

It is also apparent that such a method of fitment to avoid contact with the animal's ear and, thereby reducing the risk of cross infection, is no longer as important when considering ear tags for temporary stock such as feedlot stock, which are referred to as feedlot animal ear tags.

In the case of such temporary stock, an easier insertion process may be desirable through the use of an alternative tag and method of application.

OBJECT OF THE INVENTION

Therefore, it is an object of the present invention to provide an animal ear tag which overcomes some of these disadvantages of the prior art or at least provides the public with a useful choice.

SUMMARY OF THE INVENTION

Accordingly, in a first aspect, the invention consists of an animal ear tag comprising: a main body portion connected with one end of a flexible neck, an opposite end of the flexible neck connected with a first upper face of a head, an opposite underneath face of the head having an open slot or channel leading to an aperture in the head and a bore within the head which bore extending along a longitudinal axis of the head towards a tip portion at one end of the head, the slot or channel enabling an elongate pin of an applicator to be positioned therein and guided and inserted into the aperture and the bore to drive the tip portion of the head through an animal's ear and draw at least a portion of the neck into the animal's ear such that the head is disposed on one side of the animal's ear and the body portion is disposed on the opposite side of the animal's ear; the flexible neck enabling the head to be folded after the applicator pin has been inserted into the aperture and the bore so that the longitudinal axis of the head is substantially parallel with a longitudinal axis of the neck during insertion of the head and at least said portion of the neck into the animal's ear after which the resilience of the neck will return the head so that its said longitudinal axis is substantially at 90° relative to the longitudinal axis of the neck to hold the head in position on said one side of the animal's ear.

Further aspects of this invention may become apparent from those skilled in the art to which the invention relates upon reading the following description.

BRIEF DESCRIPTION OF THE DRAWINGS

The description will now be provided with reference to the drawings in which.

DETAILED DESCRIPTION OF PREFERRED EMBODIMENTS

Figure 1:
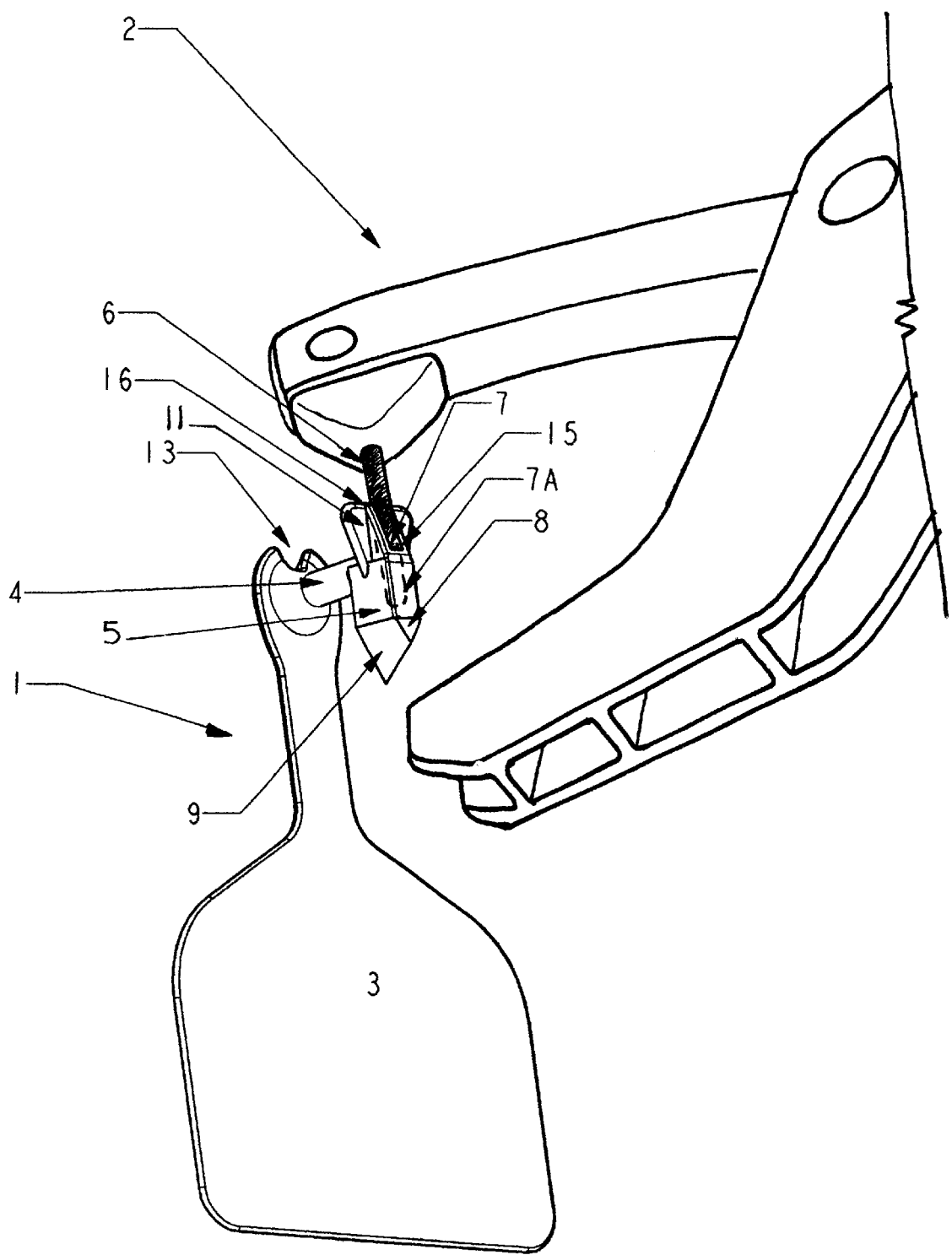
FIG. 1: shows a perspective view of an ear tag and an applicator in accordance with one embodiment of this invention in a first position.

Referring to FIG. 1, an animal ear tag 1 can be seen located in an applicator 2 ready for use.

The ear tag 1 has a main body portion 3, a neck 4 and a head portion 5 such that the head portion 5 is arranged at or adjacent a distal end of the neck 4 from that to which the main body portion 3 is attached. Such an ear tag 1 is arranged so that the main body portion 3 and head 5 can be disposed on opposed sides of the animal's ear once fitted.

As can be seen from FIG. 1, the applicator 2 has a driving means 6 to engage with an aperture in the head 5 such that the driving means 6 may drive the head 5 through an animal's ear. Although a variety of applicators 2 may be used in conjunction with this invention, the preferred form uses an applicator having a driving means comprising a pin 6 as shown in FIG. 1.

The head 5 is such that the driving means 6 locates in an aperture 7 leading into a bore 7A (shown in dotted lines) which extends towards a front tip portion end 8 of the head portion 5. The driving means 6 and the bore 7A extending from the aperture 7 terminate short of the front tip portion end 8.

In accordance with some conventional designs of ear tags, the head 5 may, as shown, be provided with a cutting means 9 at its front tip portion end 8 to pierce the animal's ear so that the remainder of the head portion 5 and at least a portion of the neck portion 4 can be placed through the opening made in the ear by the cutting means 9.

An open channel or slot 15 is provided on the under surface 11 of the head 5 extending from its edge 16, i.e. that surface on the opposite side to the surface of the head 5 connecting with the neck 4.

This open channel or slot 15 can position and guide the applicator pin 6 as it enters the aperture 7 and bore 7A.

Figure 2:
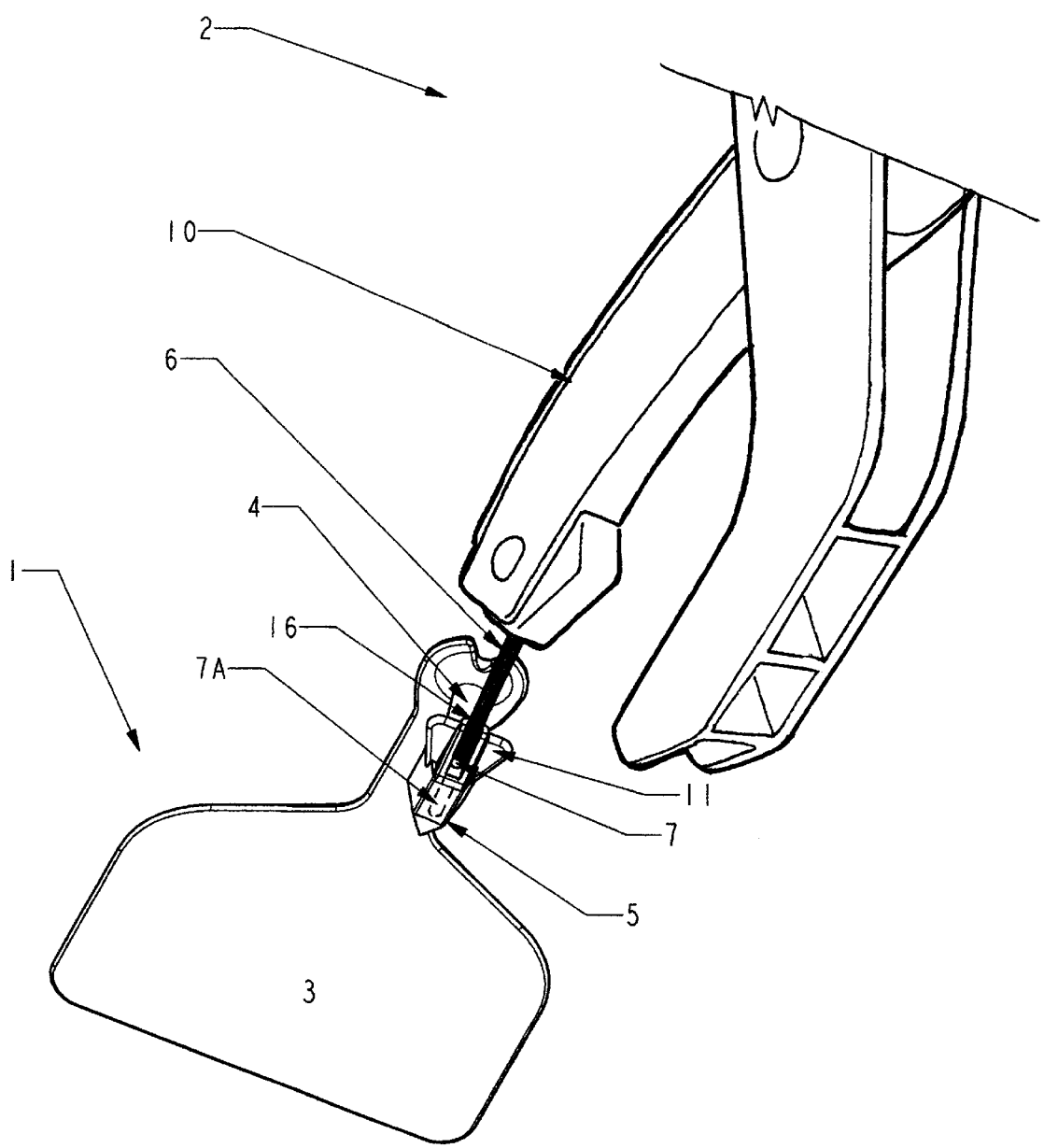
FIG. 2: shows a perspective view of FIG. 1 with the applicator pin in a second position.

Turning now to FIG. 2, the applicator 2 can be seen with the driving means 6 rotated to lie substantially parallel with the upper jaw 10 of the applicator 2. This is in accordance with a number of existing applicators 2 although this does not necessarily have to be provided in an applicator used in conjunction with this invention.

When used with this preferred form of the applicator 2, the ear tag 1 may be relatively easily engaged with the driving means 6 through fitment of the head portion 5 onto the driving means 6 through the aperture 7 and bore 7A. To facilitate easy engagement of the driving means 6 with the head 5, the aperture 7 into which the driving means 6 is inserted is provided as mentioned previously, on a distal underneath face 11 of the head 5 facing away from the main body portion 3. Also the open channel or slot 15 provided on the under surface 11 of the head 5, and extending from the edge 16 of the head 5 distal from the tip portion 8, enables the pin 6 to be readily positioned and guided into the aperture 7 and the bore 7A.

Figure 3:
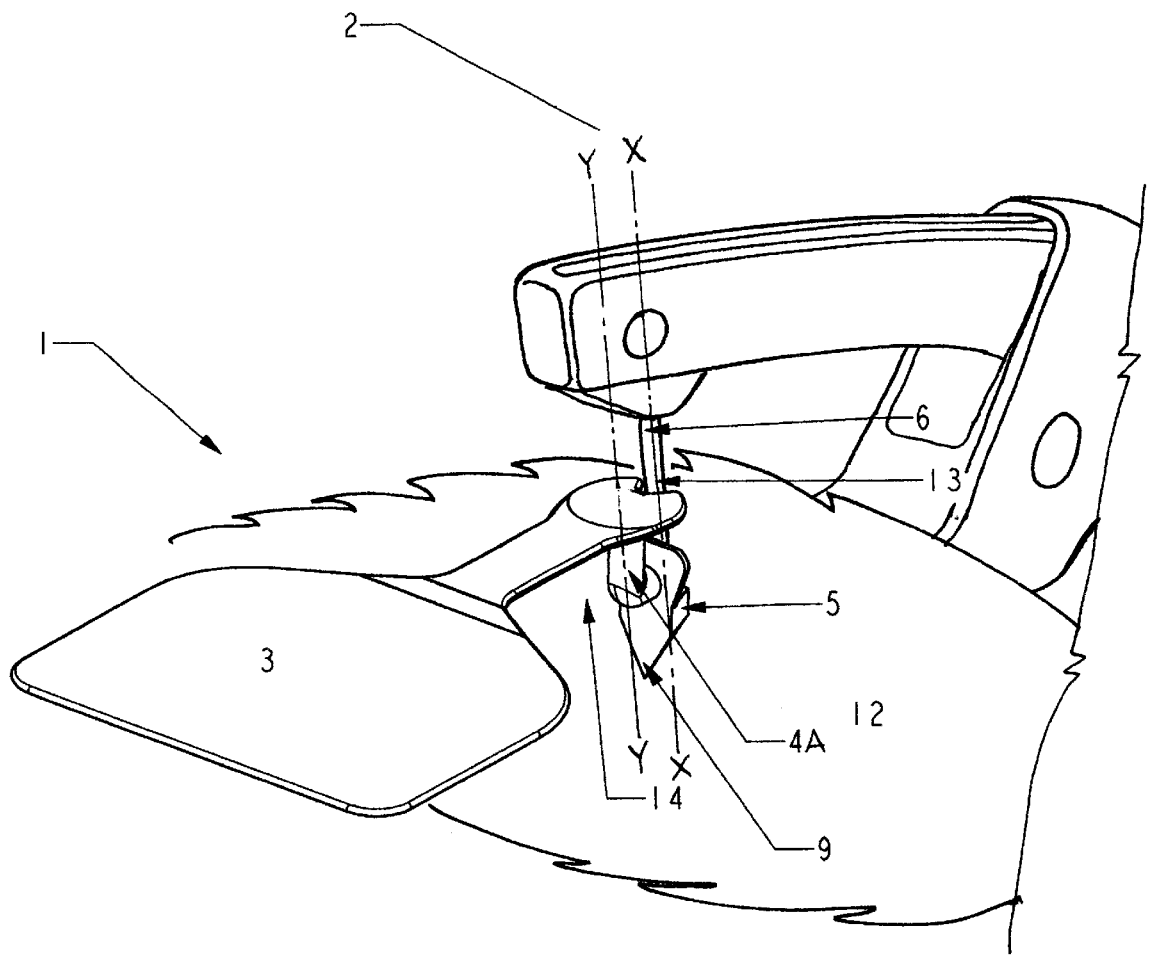
FIG. 3: shows a perspective view of an ear tag and a portion of the applicator engaging an animal's ear in accordance with this invention.

Referring now to FIG. 3, it can be seen that the applicator 2 and ear tag 1 are placed adjacent an animal's ear 12. It can be seen that the main body portion 3 and neck portion 4 are provided with sufficient flexibility so that they may fold against the driving means 6 to reduce the size of the pierced aperture required in the ear 12 to place the tag 1. In this embodiment, it can be seen that the ear tag 1 and, in particular, the main body portion 3 is provided with a recess 13 on an outer edge of the body portion 3 adjacent the connection 14 with the neck 4, or the outer edge is otherwise shaped and configured, so that the driving means 6 can be located relatively closely to the juncture 14 between the neck 4 and the main body portion 3. This allows the ear tag 1 to fold about the driving means 6 as desired to reduce the size of the aperture necessary in the ear 12 during the fitment sequence. In this position, the longitudinal axis X—X of the head 5 is shown to be substantially parallel with the longitudinal axis Y—Y of the neck 4.

The neck 4 itself is preferably constructed with a hollow core to increase the flexibility of the neck 4 so it can assume the position as shown in FIG. 3.

Figure 4:
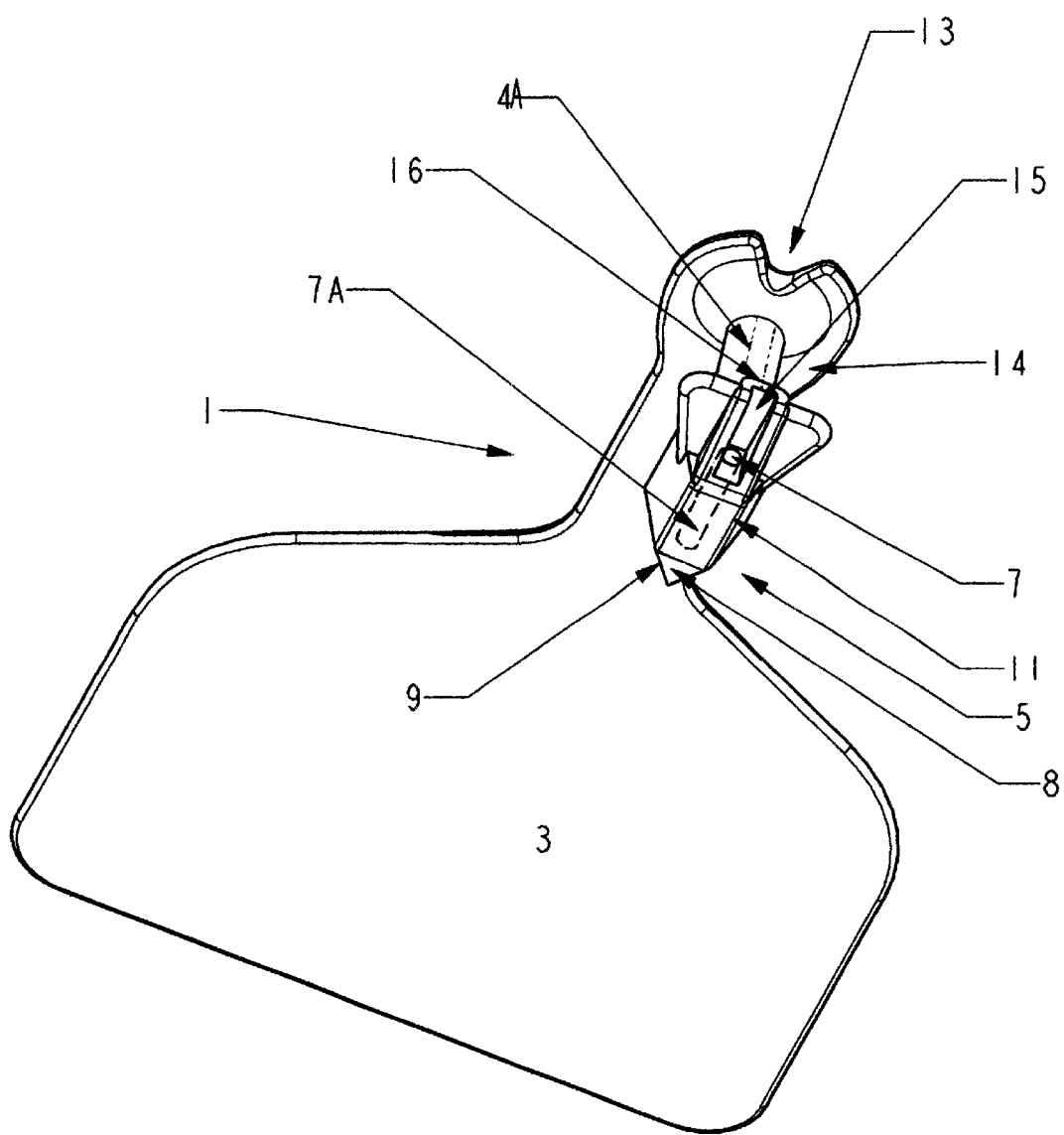
FIG. 4: shows a perspective, enlarged view from below of the ear tag of the preceding figures.
Figure 5:
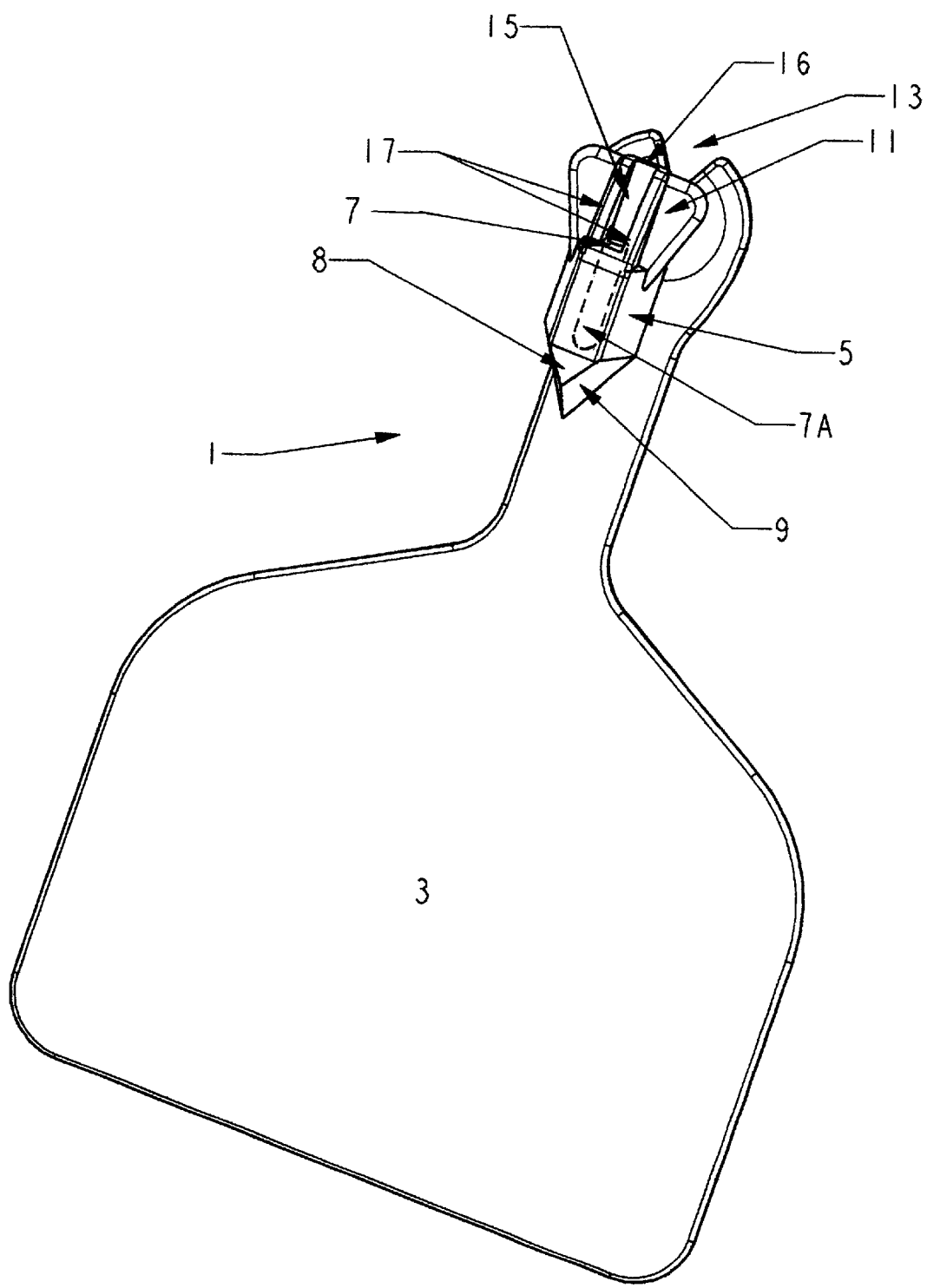
FIG. 5: shows a side perspective view of the ear tag of FIG. 4.

Referring to FIGS. 4 and 5, in the enlarged views of the tag 1 without the applicator 2, the aperture 7 is shown clearly and provided at the end of the open slot or channel 15 and leading into the bore 7A extending towards the tip portion 8. The bore 7A is shown terminating short of the tip portion 8 and the cutting means 9.

The slot or channel 15 is shown defined between a pair of spaced apart upstanding walls 17 extending outwardly from the underneath surface 11 of the head 5.

In FIG. 4, the preferred hollow core 4A of the neck 4 is shown in dotted lines.

The construction of an ear tag 1 may be through any suitable form of construction and the materials may be of any suitable form including the current materials used for such ear tags being a range of plastic materials. It is preferred that the neck 4 and main body portion 3 are made from a relatively soft material for flexibility and the head 5 or at least the cutting means 9 of the tip portion 8 may be made from a firmer material. As is the case with current ear tags 1, the cutting means 9 may be provided as a separate piece made from a different material which is then fitted to the head 5 or, in an alternative form, could be provided as part of a unitary construction of the head 5.

Thus is can be seen that the invention provides an ear tag which may be particularly useful for fitment to animals outside of those used for breeding or long term retention such that the contact between the driving means 6 and the ear 12 during the driving of the head 5 and at least a portion of the neck 4 through the ear 12 is not avoided due to the decreased concern over cross infection in stock of these types.

This enables an open slot or channel 15 to be provided on the under surface 11 of the head 5 into which the pin 6 can be readily positioned as it is guided and rapidly inserted into the aperture 7 and into the bore 7A. The exposure of the pin 6 in the open slot or channel 15 to the animal's ear as the head 5 is inserted is of no concern in such circumstances.

Such a method allows a faster application of the tag and easier manipulation of the tag. Although particularly useful in cold weather, the increased speed of fitment may be an advantage in all conditions.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope or spirit of the invention.

I claim:

1. An animal ear tag comprising a main body portion connected with one end of a flexible neck, an opposite end of the flexible neck connected with a first upper face of a head, an opposite underneath face of the head having an open slot or channel leading to an aperture in the head and a bore within the head which bore extending along a longitudinal axis of the head towards a tip portion at one end of the head, the slot or channel enabling an elongate pin of an applicator to be positioned therein and guided and inserted into the aperture and the bore to drive the tip portion of the head through an animal's ear and draw at least a portion of the neck into the animal's ear such that the head is disposed on one side of the animal's ear and the body portion is disposed on the opposite side of the animal's ear; the flexible neck enabling the head to be folded after the applicator pin has been inserted into the aperture and the bore so that the longitudinal axis of the head is substantially parallel with a longitudinal axis of the neck during insertion of the tip portion and head and at least said portion of the neck into the animal's ear after which the resilience of the neck will return the head so that its said longitudinal axis is substantially at 90° relative to the longitudinal axis of the neck to hold the head in position on said one side of the animal's ear.

2. An animal ear tag comprising a main body portion connected with one end of a flexible neck, an opposite end of the flexible neck connected with a first upper face of a head, an opposite underneath face of the head having an open slot or channel leading to an aperture in the head and a bore within the head, which bore extending along a longitudinal axis of the head towards a tip portion at one end of the head, the slot or channel enabling an elongate pin of an applicator to be positioned therein and guided and inserted into the aperture and the bore to drive the tip portion of the head through an animal's ear and draw at least a portion of the neck into the animal's ear such that the head is disposed on one side of the animal's ear and the body portion is disposed on the opposite side of the animal's ear; the flexible neck enabling the head to be folded after the applicator pin has been inserted into the aperture and bore so that the longitudinal axis of the head is substantially parallel with a longitudinal axis of the neck during insertion of the tip portion and head and at least part of the neck portion into the animal's ear and wherein an outer edge of the main body portion adjacent a connection of the body portion with the flexible neck includes a recess adapted to accommodate the applicator pin when the head is in its folded position, said recess being substantially aligned with the open slot or channel of the underneath face of the head when the longitudinal axis of the head is substantially parallel with the longitudinal axis of the neck.

3. An animal ear tag as claimed in claim 1 or claim 2, wherein the bore terminates short of the tip portion.

4. An animal ear tag as claimed in claim 1 or claim 2, wherein the neck is substantially hollow to increase its flexibility.

5. An animal tag as claimed in claim 1 or claim 2, wherein said open slot or channel is defined by a pair of spaced apart walls extending outwardly from the underneath face of the head.

* * * * *